March 3, 1931.  M. HAHN  1,794,402
SUSPENSION FOR CENTRIFUGAL EXTRACTORS
Filed Nov. 20, 1928

Inventor:
Mathias Hahn
per
Attorney.

Patented Mar. 3, 1931

1,794,402

UNITED STATES PATENT OFFICE

MATHIAS HAHN, OF AACHEN, GERMANY, ASSIGNOR TO THE FIRM OF H. KRANTZ, OF AACHEN, GERMANY

SUSPENSION FOR CENTRIFUGAL EXTRACTORS

Application filed November 20, 1928, Serial No. 320,726, and in Germany October 25, 1928.

It is common practice in the extractor art to suspend the extractors from a number of posts, preferably three, equally spaced about the periphery of the extractor by means of rods attached to the tops of the posts, on the one hand, and to lugs of the extractor tub, on the other hand. The ends of these rods are generally provided with special bearings consisting, for instance, of head pieces having spherical or hemispherical surfaces which fit in corresponding seats of the said posts and tub lugs. As the number of oscillations or swinging movements of the extractor is very high, especially in high-speed machines, the hemispherical bearing surfaces are subjected to considerable friction. If the surfaces are not very carefully lubricated, a rapid wear and sometimes even a seizing of the bearing surfaces is entailed. In the latter case the oscillating movement of the extractor is impeded and in consequence thereof an enormous increase of the strains in the suspension rods is produced which sometimes leads to breakage of the rods.

It is the object of my invention to provide an extractor suspension which does no longer possess the above-said drawbacks. To this end, I propose to mount the upper and lower ends of the suspension rods on two superimposed blades arranged crosswise with relation to one another. In this way, there is obtained a frictionless universal suspension of the rods which does not require any lubrication and attendance.

Figure 1:
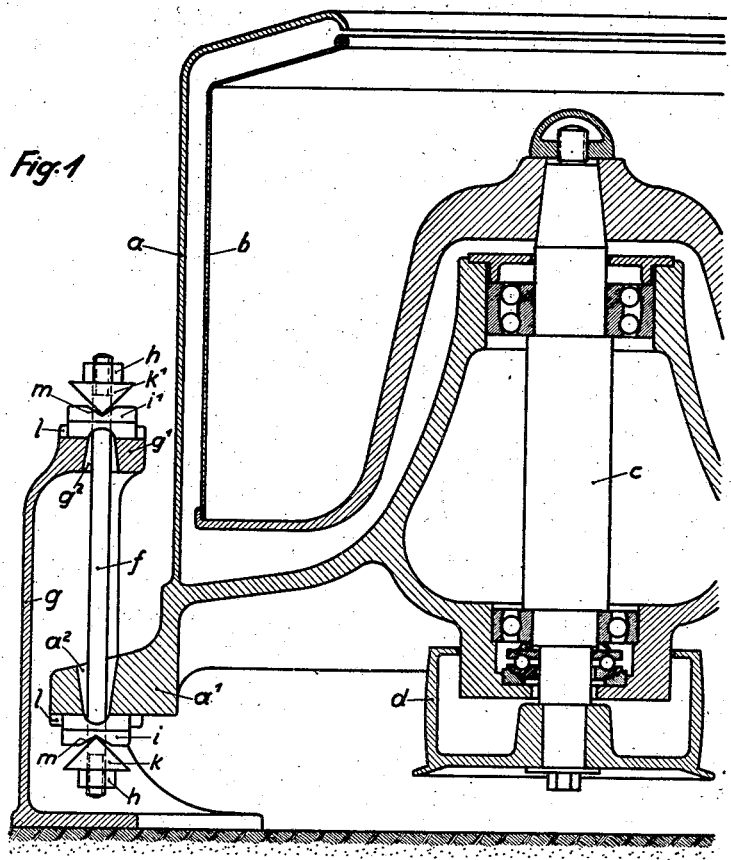
Figures 2, 3:
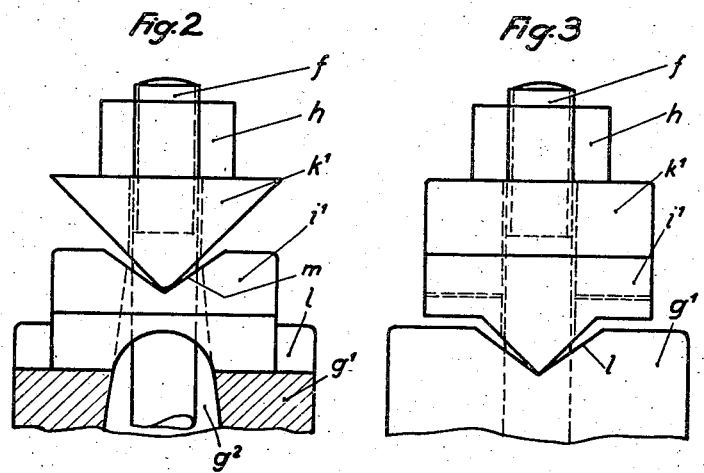

An embodiment of the invention is illustrated in the accompanying drawing, in which Fig. 1 is a sectional elevation of a portion of the extractor and its suspension, Fig. 2 is a detail view of one of the double blade bearings on an enlarged scale and Fig. 3 a similar view seen at a right angle to Fig. 2.

Referring now to the drawings in detail, $a$ is the tub of the extractor and $b$ is the basket which is rotatably supported in the tub by means of the spindle $c$ which is provided at its lower end with a driving pulley $d$. The tub $a$ is connected by means of three rods $f$ to three posts $g$ which are bolted to the floor and equally spaced about the periphery of the tub. The rods $f$ extend with play through openings $a^2$ in lugs $a^1$ of the tub $a$ and openings $g^2$ in the tops $g^1$ of the posts $g$. The rods $f$ are provided at their ends with heads form, for instance, by nuts $h$. Arranged between the nuts $h$, on the one hand, and the lugs $a^1$ and post tops $g^1$, on the other hand, are two superimposed blades $i$, $k$ and $i^1$, $k^1$, respectively. These blades have openings for the free passage therethrough of the rods $f$. The axes of the blades $i$, $i^1$ are situated at a right angle with respect to the axes of the blades $k$, $k^1$. The lugs $a^1$ and the post tops $g^1$, respectively, form seats $l$ for the blades $i$ and $i^1$, while the seats $m$ for the blades $k$ and $k^1$ are formed by the blades $i$ and $i^1$.

The described double blade bearings constitute universal suspensions for the rods $f$ in which there is no friction and which do not require lubrication.

Having thus described my invention, what I claim as new and desire to secure by Letters-Patent, is:—

A suspension for centrifugal extractors, comprising in combination a plurality of supporting posts spaced about the periphery of the extractor, connecting rods between the posts and the extractor tub one end of which passes through the posts and the opposite end through the tub, a head on each end of the rods, and substantially frictionless bearings formed between the head at one end of the rod and the supporting post and between the head at the other end of the rod and the tub, said bearings including relatively crossed blades presenting knife edge contact, the rod passing through the blades.

In testimony whereof I have signed my name to this specification.

MATHIAS HAHN.